July 28, 1959

E. B. JENSEN 2,896,309

TIRE RASP

Filed July 5, 1957

INVENTOR.
Emil B. Jensen,
BY

July 28, 1959   E. B. JENSEN   2,896,309
TIRE RASP
Filed July 5, 1957   2 Sheets-Sheet 2
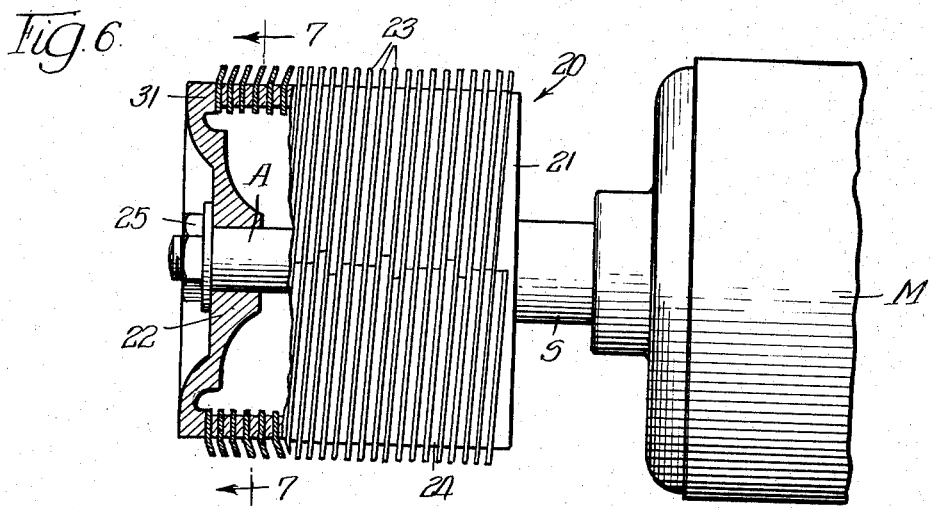
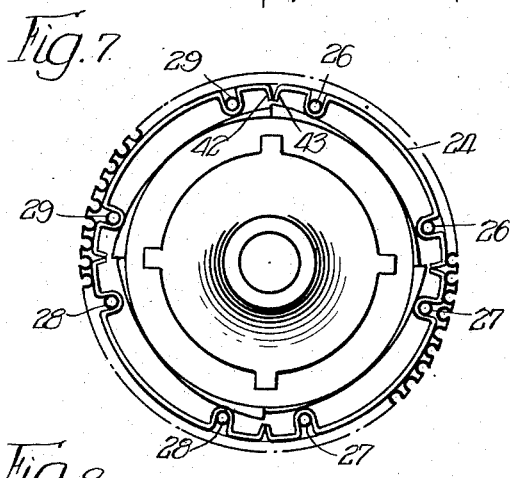
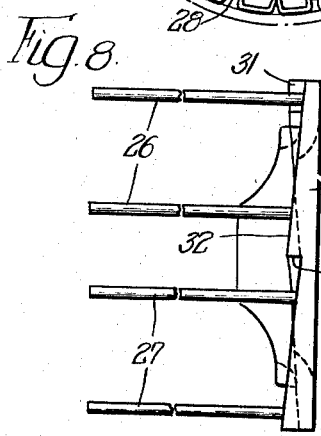
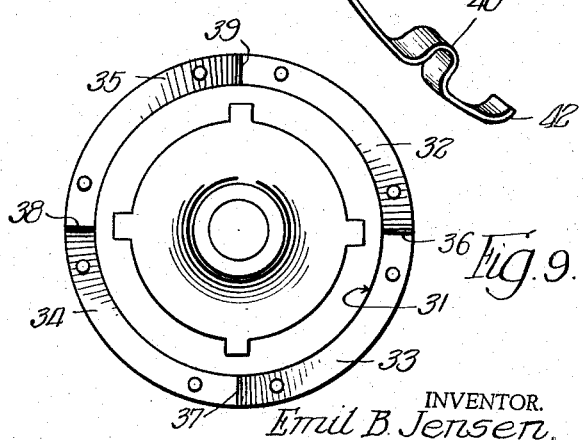
INVENTOR.
Emil B. Jensen,

United States Patent Office 2,896,309
Patented July 28, 1959

2,896,309

TIRE RASP

Emil B. Jensen, Chicago, Ill.

Application July 5, 1957, Serial No. 669,987

2 Claims. (Cl. 29—79)

This invention relates to tire rasps or similar devices such as are used in the buffing or abrading of a rubber tire to prepare the tire carcass for vulcanizing, recapping or retreading.

As is well known, the useful life of a rubber tire can be lengthened by applying a new rubber wear surface to its body or carcass after the initial tread has worn and if there have been no serious breaks or other injury to the carcass. Before this is done, however, the tire is subjected to treatment to remove as far as possible all old rubber and broken wire treads down to the fibre body of the tire. This is conventionally accomplished by moving the peripheral surface of the tire against a rapidly revolving tire rasp of cylindrical shape provided with teeth which act to loosen, tear and grind off the excess old rubber on the tire carcass and also to roughen the remaining surface or otherwise condition it to effectively bind to the new rubber applied in the vulcanizing or recapping operation.

Previous to the present invention, said teeth were usually formed by securing tacks or other pronged members in and about the cylindrical surface of the rasp with their sharpened ends protruding outwardly therefrom.

In my Patent No. 2,703,446, issued March 8, 1955, I disclose a rasp wherein said teeth comprise arcuate blades provided with a saw toothed outer-periphery and were mounted on pairs of support pins extending at right angles between a front and a back cylindrically shaped end plate, and with spacers mounted adjacent each toothed blade upon said pins so that the toothed blades were presented edgewise to the periphery of the rasp and formed spaced rows of pointed teeth spiraling about the periphery of the rasp. By the arrangement there disclosed, various buffing or abrading actions could be obtained by increasing or decreasing the spacing between the rows of cutting teeth or by grouping more than one blade in adjacent relation under extreme conditions as when buffing extremely heavy or sturdy tires to remove broken wire treads. A further advantage of the arrangement is the convenience afforded in disassembly and reassembly to remove and replace worn or broken blades.

I have now found that by reshaping the cutting teeth of such blades in a novel manner to be hereinafter more fully described, I can increase the rate at which the old rubber can be removed from the tire carcass and at the same time reduce the amount of heat developed so that the blades last considerably longer and do not need to be replaced as often.

This I accomplish by forming the edge of the arcuate blades with circular openings which open into the blade edge to leave a plurality of flat teeth having leading and trailing edges of convex arcuate shape which I preferably set at a small angle to increase their cutting power.

Thus a first and major object of the invention is to provide a tire rasp having replaceable teeth which will be more efficient in its abrading or buffing action on the rubber tire carcass, will run cooler than possible with previously available tire rasps and at the same time cutting the rubber off at a much faster rate.

A further object of the invention is to provide a toothed blade for a tire rasp which will be simple, economical and practical to manufacture, which will be self sharpening and have a longer useful life by reason of its capability to remove the old rubber from rubber tire carcasses at a faster rate and while developing less heat and thus being operable at a considerably cooler temperature.

Many other objects and advantages of my invention will be at once apparent or will become so from the more detailed description thereof which follows, reference being had to the accompanying drawings in which:

Figure 6 is a side elevational view of a tire rasp mounted upon the shaft or arbor of a motor, with parts broken in section, and showing the blades mounted thereon in their position of use;

Figure 7 is a sectional view through the tire rasp taken on lines 7—7 of Figure 6;

Figure 8 is a side elevational view of the back end plate showing the support pins extending at right angles therefrom;

Figure 9 is a front view of the back plate shown in Figure 4; and

Figure 10 is a front perspective view of a preferred form of spacer.

Figure 1:
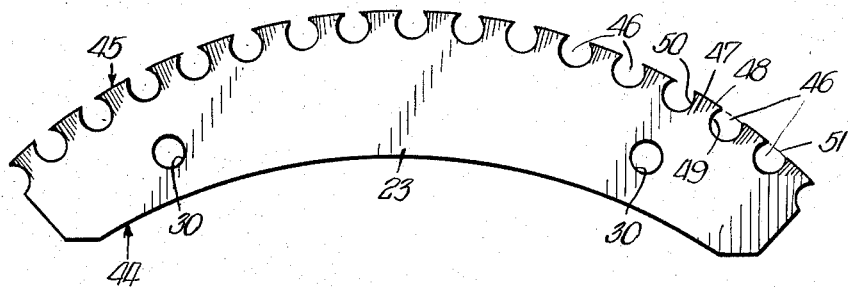
Figure 1 illustrates a blade for a tire rasp constituting the preferred form of the invention.

Referring more particularly to the several views wherein like parts are identified by like reference numerals, and first to Figure 6, a tire rasp 20 is there illustrated as mounted upon an arbor or shaft A of a motor M, said shaft A having an enlarged shank S against which the back cylindrical plate 21 of the tire rasp is positioned, its front cylindrical plate 22 being mounted at the forward end of shaft A, between which are supported the toothed quadrant shaped blades 23 and spacers 24, the entire assembly constituting the tire rasp 20 being fastened by means of a nut 25 or the like screw threadedly mounted on the end of shaft A. As shown best in Figures 7, 8 and 9, the back cylindrical plate 21 has four pairs of equally spaced support pins 26, 27, 28 and 29 extending transversely therefrom, the front cylindrical plate having complementary openings to receive the same. The quadrant shaped blades 23 also have a pair of openings 30 sized to receive the pins 21 and spaced apart a distance equal to the common spacing of the pins of each of said pairs 26, 27, 28 and 29 whereby the blades may be assembled over any one of said pairs of pins.

Both the back plate 21 and the front plate 22 are provided with a peripheral shoulder 31, said shoulder 31 being provided with four quadrant shaped tapered faces 32, 33, 34 and 35, the tapered face 32 sloping away from the outer edge of the plate and terminating in an abrupt shoulder 36, the tapered face 33 terminating in a similar shoulder 37, the face 34 in a shoulder 38 and the face 35 in a shoulder 39. As best seen in Figure 8 the slope of each face is one-half the width of the plate 21 or 22 so that the blades 23 when mounted in the pins and placed thereagainst will be at an angle to the edge of the end plates 21 and 22 and provide a spiral row of cutters from the rear to the forward plate (see Fig. 6).

In order to separate the spiral rows of cutters, spring clip spacer members 24 as illustrated in Figure 10 are preferred although any other means such as rings or discs may be utilized, if desired. Said spacer member 24 may be of any desired width and are formed with socket portions 40 and 41 to snap over a set of said support pins 26, 27, 28 or 29, and further have inwardly turned ends 42 and 43 forming ledges which frictionally engage against similar ledges of the spacer members mounted upon the pairs of spacer pins to either side thereof. Thus, as shown best in Figure 7, the spacer members 24 when placed into end-to-end engagement about the four pairs of support pins form a completely circular spacer between adjacent aligned rows of blades 23.

Figure 2:
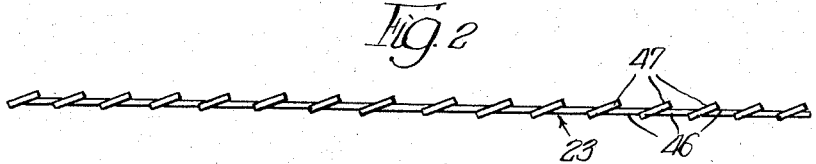
Figure 2 is a top plan view thereof.

The cutting blades 23 which may be stamped or otherwise cut from sheet stock are each of generally elongated arcuate shape as illustrated in Figure 1 having inner concave 44 and outer convex 45 arcuate edges in parallel shaped relation, the outer edge 45 having a plurality of spaced circular cutouts 46 communicating with said edge at 51 to provide flat teeth 47 characterized by a convex outer edge 48 and opposed side edges 49 and 50 of concave shape. Preferably as shown in Figure 2 each of said teeth 47 may be offset at a small angle from parallelism with the remainder of the blade.

In tests conducted it has been found that tire rasps when assembled with blades having this particular shape of teeth run 60% cooler than the sawtoothed type blade illustrated in my prior Patent No. 2,703,446 while cutting off the old rubber from a tire carcass up to three times as fast. Although the explanation for this is not known, I have noted that whereas the saw-toother type blade reduces the removed old rubber to a powdery form, the abrading action of the blades according to the present invention produced leavings not as granular in shape but having a length several times their other two more equal dimensions so that the action of a rasp having teeth according to the present invention may be considered to have more of a slivering rather than a pulverizing action on the rubber as it is removed and this characteristic action may be indicative of why it abrades at a cooler temperature although cutting much more effectively and as a consequence having several times the normal life of the saw-tooth type blade.

For most purposes, I have found that a nine inch diameter rasp works satisfactorily and although the number of teeth may vary and is not definitive of my invention, I prefer to provide each blade which has a length equal to 90° of a 9 inch diametered circle with 16 teeth, the space 46 therebetween constituting the major portion of a circle having a diameter equal to about .312 inch and the center of which circle is spaced about .062 inch inwardly from edge 45 to provide a communicating entrance 51 of about .25 inch.

Figure 3:
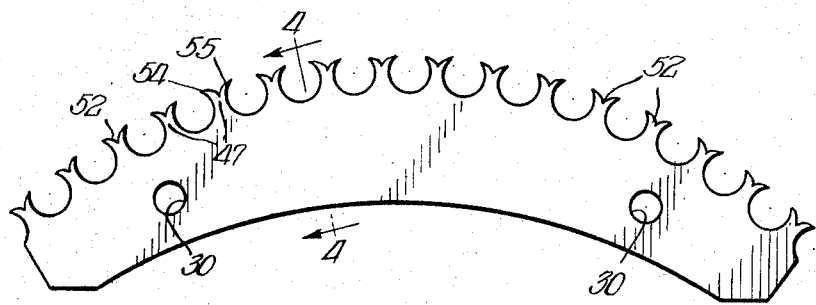
Figure 3 illustrates a second form of the invention.
Figure 4:
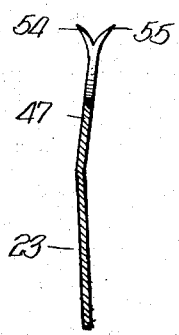
Figure 4 is a sectional view taken along lines 4—4 in Figure 3.
Figure 5:
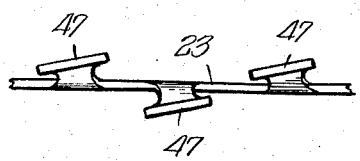
Figure 5 is a fragmentary top plan view of a third form of blade according to the invention.

Although I have shown the teeth in the preferred embodiment offset from the plane of the remainder of the blade and in generally parallel relation to each other, I have found that satisfactory results can be obtained with various other settings and/or twists given the blade teeth. Thus for example, as indicated in Figure 5, every other tooth may be deflected to one side of the plane of the blade and the intervening teeth to the opposite side thereof. Also as indicated in said Figure 5, the teeth may also be given a slight twist so as not only to be lying to the side of the plane of the blade but at an angle intersecting said blade plane. In Figures 3 and 4 I have illustrated a further variant wherein each of the blades teeth 47 have a V section 52 cut out of their end surface 48 to divide each into a double pronged tooth, prong 54 thereof tapering to the left of the Figure 3 and prong 55 to the right of Figure 3. Preferably in this construction, I not only offset each tooth 47 as in the manner indicated in Figure 2 but I further offset the prongs, one to one side of the plane of the tooth 47 and the other prong to the opposite side of said plane to increase the cutting action.

It will be at once apparent that in accordance with the severity of the abrading action required and for other reasons a variety of twists and settings may be given to the teeth of such a blade and are intended to be included within the scope of the claims hereto appended.

Having described my invention, I claim:

1. A replaceable blade for a rasp used to buff the rubber carcass of an automobile tire, said blade comprising a sheet metal member of essentially uniform thickness having a planar main body and an interrupted outer working edge of generally convexed arcuate shape, said main body portion having means spaced from said arcuate working edge by which the blade may be removably mounted on a tire rasp, and said arcuate working edge including a plurality of equi-shaped, constant-sized, circular cutouts which directly interrupt said edge and form teeth of generally dovetail shape between each adjacent pair of cutouts, said teeth each having its leading and trailing edges defined by the curvature of said cutouts, said teeth being of uniform size, constant thickness and each characterized by essentially parallel opposed sides and oppositely disposed concave shaped trailing and leading edges which extend out to the outer edge of the blade, said teeth being disposed in transverse relation to the plane of said main body portion, and the cutouts between each adjacent pair of said teeth defining a major arc of constant diameter having a mouth interrupting the outer edge of the blade and which mouth is of a width less than the said diameter of said major arc.

2. A replaceable blade for a rasp as claimed in claim 1 wherein said teeth have their outermost edge portions disposed in parallel planes angularly related to the plane of the main body portion of said blade.

References Cited in the file of this patent

UNITED STATES PATENTS

| | | |
|---|---|---|
| 73,226 | Boynton | Jan. 14, 1868 |
| 112,569 | Emerson | Mar. 14, 1871 |
| 657,336 | Dale | Sept. 4, 1900 |
| 852,873 | Davidson | May 7, 1907 |
| 2,369,273 | Bakewell | Feb. 13, 1945 |
| 2,703,446 | Jensen | Mar. 8, 1955 |